United States Patent
Trottman

(10) Patent No.: US 7,069,487 B2
(45) Date of Patent: Jun. 27, 2006

(54) PATTERN MATCHING TO VALIDATE AND CLASSIFY COMPUTER VARIABLES TO ONE OR MORE NAME RANGES

(75) Inventor: Douglas Alan Trottman, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 682 days.

(21) Appl. No.: 10/361,247

(22) Filed: Feb. 10, 2003

(65) Prior Publication Data

US 2004/0158554 A1    Aug. 12, 2004

(51) Int. Cl.
G06F 11/00 (2006.01)
G06F 3/12 (2006.01)

(52) U.S. Cl. ................................ 714/736; 358/1.1
(58) Field of Classification Search ............... None
See application file for complete search history.

(56) References Cited

U.S. PATENT DOCUMENTS

| | | | |
|---|---|---|---|
| 6,366,695 B1 * | 4/2002 | Nicholson et al. | 382/173 |
| 6,381,028 B1 * | 4/2002 | Gauthier | 358/1.11 |
| 6,771,387 B1 * | 8/2004 | Gauthier | 358/1.15 |

* cited by examiner

Primary Examiner—Christine T. Tu
(74) Attorney, Agent, or Firm—Jerry W. Herndon

(57) ABSTRACT

A technique of logically processing bit maps and character maps describing the attributes and values of computer variable ranges and a variable being tested to determine if a match exists between the variable and one or more ranges. Bit maps define the attributes of each character position of variables and ranges; character maps define which character positions are constrained to a fixed character for each of the ranges. This quick and efficient method of logical processing of maps replaces the known method of examining each character position of a variable individually.

12 Claims, 1 Drawing Sheet

PATTERN MATCHING TO VALIDATE AND CLASSIFY COMPUTER VARIABLES TO ONE OR MORE NAME RANGES

TECHNICAL FIELD

The invention relates to data processing and particularly to the field of categorizing the contents of computer variables into one or more variable spaces.

BACKGROUND OF THE INVENTION

It is common in the data processing industry to validate computer addresses, the value of variables, and such, before using the values to perform computer operations. There are many reasons to categorize variables, ranging from validity checking to usage counting. In the case of validity checking, such validation before use can avoid unnecessary interference with the orderly operation of data processing systems and computers.

It is known to perform simple range checks on the contents of variables in which all character positions of a variable have the same attributes, such as base 10 digits, (e.g. 100–999), or hexadecimal (e.g. 0000–FFFF). When variables can take on disjoint values, it is also known to perform simple range checks on each possible disjoint range. U.S. Pat. No. 4,692,897 and Laid Open Japanese application JP 2000020351A2 are examples of such prior art techniques.

However, such techniques can become burdensome and consume a disproportionate share of computer resources when there are many possible ranges. The problem becomes more complicated when the different character positions of a variable can have different attributes. For example, a system may use many variable ranges in which each position within a variable is characterized by different attributes (decimal referred to as numeric herein, alphanumeric, alphabetic, hexadecimal, fixed, etc.) In a real system, there can be hundreds or thousands of variable ranges to check. In some cases, all ranges must be checked to determine which ranges match the variable. In other cases, they must be checked at least until a match is found. There can be many reasons these checks are needed; updating of use-counts is a typical reason.

A system can define many variable ranges. Each variable range is defined by a start variable, an end variable, and the attribute of each character position in the variable. For example, a three character variable range can start with A10 and end with D8F. The first character is an alphabetic range, the second character is a numeric range, and the third character is a hexadecimal range. Shorthand notation of this range would be A10–D8F (Alpha,Numeric,Hex) where the characteristics of each position are defined within the parentheses. Character position 1 (A and D) is an Alphabetic range, character position 2 (1 and 8) is a numeric range, and character position 3 (0 and F) is a hexadecimal range.

The variable ranges may overlap or intersect each other.
For example, consider the following variable ranges:
C13 to C26 (Fixed,Num,Num)
C15 to C2C (Fixed,Num,Hex)
C17 to C2M (Fixed,Num,Alphanum)

It is important to realize how variables increment. It is clear that C13–C26 includes the variable C18. It is less obvious that C15–C2C includes the variable C1D or that C17–C2M includes the variable C1X.

As known in the prior art, it is relatively easy to determine if a variable value is within the start and end boundaries of a range. If there are many disjoint ranges in which all character positions of each range have the same attributes, it is relatively easy to check each range, but this quickly becomes too costly in terms of performance. When the character positions have different attributes, each character position can be checked individually, but that is extremely costly in terms of performance. The processing overhead increases as the length of the variable increases and the number of different character attributes increases. A method is needed to quickly determine if a variable value matches a range definition without checking each character individually.

SUMMARY OF THE INVENTION

The invention provides a technique of logically processing bit maps and character maps that describe the attributes and values of the variable ranges and a variable being tested to determine if a match exists between the variable and one or more ranges. Bit maps define the attributes of each character position of variables and ranges; character maps define which character positions are constrained to a fixed character for each of the ranges. This quick and efficient method of logical processing of maps replaces the known method of examining each character position of a variable individually.

In the preferred embodiment, each character position of a variable is associated with an attribute that defines a type of value for that character position. When a variable arrives, a bit map is created for the variable and that bit map is compared with range bit maps, wherein each range bit map contains logical representations of the attributes associated with the types of values each character position of a variable can legitimately acquire. The variable is further compared with a character map for each range, wherein each character map describes whether each character position of the variable is constrained to a fixed character. If both of these comparison operations succeed for a given range, then the variable is considered to match that specific range.

DETAILED DESCRIPTION

Figure 1:
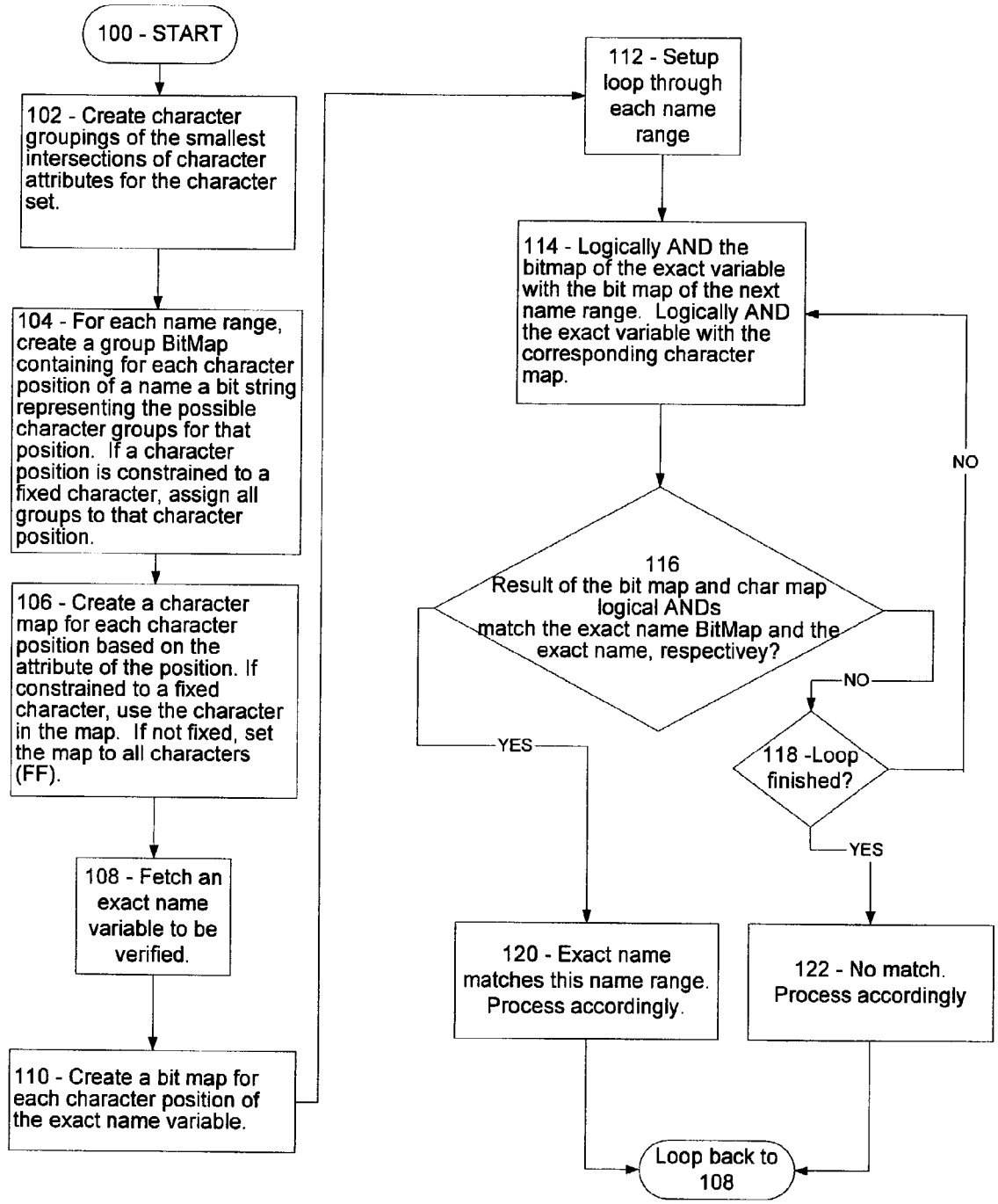
FIG. 1 contains a flowchart of the steps of the invention.

For the preferred embodiment, it is assumed that each character position in the variable must fall within one or more of the following types:
Numeric (0–9)
Hexadecimal (0–9,A–F)
Alphabetic (A–Z)
Alphanumeric (0–9,A–Z)
All (0–9,A–Z,!,@,#,$,%)

It is also assumed that the order of characters is:
blank,0,1,2,3,4,5,6,7,8,9,A,B,C,D,E,F,G,H,I,J,K,L,M,N,O, P,Q,R,S,T,U,V,W,X,Y,Z,!,@,#,$,%

The character types and ordering are arbitrary and can be varied as desired in any embodiment.

Consider the example of range values given above:
Range 1. C13 to C26 (Fixed,Num,Num)
Range 2. C15 to C2C (Fixed,Num,Hex)
Range 3. C17 to C2M (Fixed,Num,Alphanum)

It is assumed that alphabetic letters, like numbers, increment to their highest value before the next position to the left increments. Below is the complete list of values contained within the three ranges defined above.

For Range 1
C13–C19
C20–C26

For Range 2
C15–C19
C1A–C1F
C20–C29
C2A–C2C

For Range 3
C17–C19
C1A–C1Z
C20–C29
C2A–C2M

Depending on the exact variable, the variable may fit within one or several of the variable ranges defined above. For example, variable C18 fits within all three ranges; variable C1D fits within ranges (2) and (3); variable C1X fits within range (3) only.

As mentioned previously, known solutions include checking each character position individually to see if the character is within the character range of that position. Not only is that a long process as the number of characters grows, but the computer code used for each check involves several machine instructions for each position to compare high and low values against the current value. As the number of character positions grow, as the number of ranges to be checked grows, and as the number of variables checked grows, the entire procedure becomes more and more processor intensive.

A particular variable may appear to fit within a range, but in fact does not because one of its characters does not match a character type defining the range. For example, the variable CC6A fits only the second range of ranges.

1st range: CC00–CC99 (Fixed,Fixed,Numeric,Numeric)
$2^{nd}$ range: CC20–CC7A (Fixed,Fixed,Numeric,Hexadecimal)
$3^{rd}$ range: BG50–DG7C (Alpha,Fixed,Numeric,Hexadecimal).

The range CC00 . . . CC99 (Fixed, Fixed, Numeric, Numeric) has 100 variables: CC00–CC09, CC10–CC19, . . . , CC80–CC89, CC90–CC99.

The range CC20 . . . CC7A (Fixed, Fixed, Numeric, Hexadecimal) has 91 variables: CC20–CC29, CC2A–CC2F, CC30–CC39, CC3A–CC3F, . . . CC60–CC69, CC6A–CC6F, CC70–CC79, CC7A–CC7A.

The range BG50 . . . DG7C (Alpha, Fixed, Numeric, Hexadecimal) has 365 variables BF50–BF9F, CF00–CF9F, DF00–DF7C.

In this example using the value CC6A, the first range is not matched because the right-most character "A" is not numeric. The last range is not matched because the second character "G" is not a fixed "C".

In the preferred embodiment, each character above is converted to a number starting with 0 for blank and increasing up to 42 for %. This allows for quick determinations of range calculations according to the algorithm below. However, it is not necessary to use this convention; any notational scheme will work in principle.

Range matches are determined quickly and conveniently using the following steps.

Step 1. Create character groupings based on the smallest intersections of character attributes. For example,

TABLE 1

| Attribute/Group | Group 1 | Group 2 | Group 3 | Group 4 |
|---|---|---|---|---|
| Numeric | 0–9 | | | |
| Hexadecimal | 0–9 | A–F | | |
| Alphabetic | | A–F | G–Z | |
| Alphanumeric | 0–9 | A–F | G–Z | |
| All | 0–9 | A–F | G–Z | !–% |

In this example, a character can be in one of four groups. Group 1 (0–9), Group 2 (A–F), Group 3 (G–Z), or Group 4 (!–%)

For example, the letter C is part of group 2.

Step 2. For each character position of a variable range, create a bit map (preferably from left to right) that is True for each of the groups above that represents an attribute of that position. Then concatenate these character bit maps into a range bit map. If a character position does not change (i.e., Fixed), label it Fixed and assign all groups to that character position.

Range 1: CC00 . . . CC99 (Fixed, Fixed, Numeric, Numeric)

| | | |
|---|---|---|
| $1^{st}$ character = Fixed | All groups | BitMap = 1111 |
| $2^{nd}$ character = Fixed | All groups | BitMap = 1111 |
| $3^{rd}$ character = Numeric | Group1 | BitMap = 1000 |
| $4^{th}$ character = Numeric | Group1 | BitMap = 1000 |
| Range 1 BitMap = 1111 1111 1000 1000 | | |

For Range 1, since the first position of the variable has a Fixed attribute, all character groups are assigned to that character position, so that the bit map for this position is 1111. Likewise for character position 2. Character position 3 has a numeric attribute. Reference to Table 1 shows that the numeric attribute matches only Group 1. Therefore, the bit map for this character position is 1000. Likewise for character position 4.

Range 2: CC20 . . . CC7A (Fixed, Fixed, Numeric, Hexadecimal)

| | | |
|---|---|---|
| $1^{st}$ Character = Fixed | All groups | BitMap = 1111 |
| $2^{nd}$ Character = Fixed | All groups | BitMap = 1111 |
| $3^{rd}$ character = Numeric | Grp1 | BitMap = 1000 |
| $4^{th}$ character = Hex | Grp1, Grp2 | BitMap = 1100 |
| Range 2 BitMap = 1111 1111 1000 1100 | | |

Range 3: BG50 . . . DG7C (Alpha, Fixed, Numeric, Hexadecimal)

| | | |
|---|---|---|
| $1^{st}$ character = Alpha | Grp2, Grp3 | BitMap = 0110 |
| $2^{nd}$ character = Fixed | Special case | BitMap = 1111 |
| $3^{rd}$ character = Numeric | Grp1 | BitMap = 1000 |
| $4^{th}$ character = Hex | Grp1, Grp2 | BitMap = 1100 |
| Range 3 bitmap = 0110 1111 1000 1100 | | |

Step 3. Create a Character Map for each character position based on whether or not the position is Fixed. If a position is Fixed to a character, use the character itself for that position in the character map. If the position is not fixed, set that position of the character map to represent all characters (FF).

Range 1: CC00 . . . CC99  CharacterMap =  C  C  FF  FF
Range 2: CC20 . . . CC7A  CharacterMap =  C  C  FF  FF
Range 3: BG50 . . . DG7C  CharacterMap =  FF  G  FF  FF Step 4. Create a bit map for each character position of the exact variable CC6A.

CC6A BitMap=0100 0100 1000 0100

Step 5. Logically AND the bit map of the exact variable CC6A (0100 0100 1000 0100) with the bit map of a variable range. Logically AND the exact variable (CC6A) with the character map of a variable range. If the result of the bit map comparison match the original exact variable bit map and the result of the comparison of the exact variable to the character map is equal to the exact variable, then the exact variable fits within that variable range.

In this specific example, the first range is not a match because the resulting bit map of the logical AND does not match the original CC6A bit map in the last character position.

| CC00...CC99 | BitMap | 1111 | 1111 | 1000 | 1000 | CharMap | C | C | FF | FF |
| CC6A | BitMap | 0100 | 0100 | 1000 | 0100 | CharMap | C | C | 6 | A |
| Result | | 0100 | 0110 | 1000 | 0000 | CharMap | C | C | 6 | A |

The second range is a match because the resulting bit map and character map both match the original CC6A bit map and character map, respectively.

| CC20...CC7A | BitMap | 1111 | 1111 | 1000 | 1100 | CharMap | C | C | FF | FF |
| CC6A | BitMap | 0100 | 0100 | 1000 | 0100 | CharMap | C | C | 6 | A |
| Result | | 0100 | 0100 | 1000 | 0100 | CharMap | C | C | 6 | A |

The third range is not a match because the resulting character map does not match the original CC6A character map in the second character position.

| BG50...DG7C | BitMap | 0110 | 1111 | 1000 | 1100 | CharMap | FF | G | FF | FF |
| CC6A | BitMap | 0100 | 0100 | 1000 | 0100 | CharMap | C | C | 6 | A |
| Result | | 0100 | 0100 | 1000 | 0100 | CharMap | C | 0 | 6 | A |

The benefit of this logical procedure is that each logical AND can be done using only one assembler instruction. The entire bit map/character map procedure can be performed in only a few instructions. Any other method would require many more instructions because each character position would have to be analyzed.

Immediately below is pseudo code that illustrates the assembler code needed for a range check.

| If (Range_BitMap AND Variable_BitMap = Variable_BitMap) & | <-- AND the bitmap and compare |
| (Range_CharMap AND Variable = Variable) Then | <-- AND the character map and compare |
| L R06,RANGEPTR | <- Get address of range data |
| MVC WORKAREA(8),RANGE_BITMAP(R06) | <- Move range bitmap into workarea |
| NC WORKAREA(8),VARIABLE_BITMAP | <- AND range bitmap with variable bitmap |
| CLC WORKAREA(8),VARIABLE_BITMAP | <- Compare result with variable bitmap |
| BNE NO_MATCH | <- If not equal, branch to |

| | |
|---|---|
| MVC WORKAREA(8),RANGE_CHARMAP(R06) | <- Move range character map into workarea |
| NC WORKAREA(8),VARIABLE | <- AND range character map with variable |
| CLC WORKAREA(8),VARIABLE | <- Compare result with variable name |
| BNE NO_MATCH | <- If not equal, branch to NO_MATCH |

FIG. 1 illustrates a preferred embodiment of the steps of the method. The method can be performed by any computer, including mainframes and personal computers. In the preferred embodiment, the method is executed in an IBM mainframe running the z/OS operating System, such as a zSeries 900 or zSeries 800.

Steps 100 to 106 are executed initially at system load time, or perhaps as part of the system design process if desired. In either case, step 102 creates a set of character groupings that represent the smallest intersections of character attributes for the character set in use to describe variables. This step corresponds to step 1 described above. Next, step 104 creates, for each character position of a range, a bit map (preferably from left to right) that is True for each of the character groups that represents an attribute of that character position. These bit maps are concatenated into a range bit map. If a character position does not change, i.e. it has a Fixed attribute), then the bit map for that position is assigned all groups. This corresponds to step 2 described above.

Step 106 creates a character map that represents each character position of a range. If the attribute for a given character position is Fixed, then the fixed character is used in the character map for the corresponding position. If the attribute is not fixed, then the corresponding position in the character map is set to all characters (Hex FF). This step corresponds to step 3 in the above description.

At this point, initialization is complete and the system is ready to process actual exact range variables. Step 108 symbolically represents the arrival of an exact range variable for verification and classification. In step 110, a bit map is created for each character position of the exact variable in the same fashion as described above for the initialization of range bitmaps. The actual values in each position of the exact variable are used as a character map. Step 112 sets up a loop through all of the possible ranges defined for the system. Step 114 logically ANDs the created bit map of the exact variable with the bit map of the present range in the loop. This step also ANDs the character map for this range with the exact character. At step 116, if the results of the bit map AND operation and the character map AND operation match both the exact variable bit map and the exact variable, respectively, then the exact variable falls within the range represented by this particular loop. In this event, step 120 processes the exact variable according to a match. The final processing on a range match is system-specific and not relevant to the invention. If either the bit map or the character map AND operations fail, the exact variable does not fit within the present range being tested and step 118 continues to the next range in the loop or terminates at step 122 if completed. In either event, operations continue symbolically at step 108 to fetch and process another exact variable.

Artisans in the field of this invention will quickly realize that the preferred and disclosed embodiment can have many minor variations that are within the intent and scope of the teaching. It is the intent of the inventor to encompass these variations to the extent possible in accordance with the state of the applicable relevant art in the field of the invention.

I claim:

1. In a computer system, a method of identifying one or more defined variable name ranges to which a variable belongs, wherein each character position of the variable is associated with an attribute that defines a character type for that character position, comprising creating a bit map for the variable, comparing the variable bit map with bit maps that characterize the ranges and comparing the variable with character maps to determine a variable range that matches the variable, wherein each range bit map contains logical representations of the attributes associated with the character types each character position of a variable can acquire, and each character map describes whether each character position of a variable is constrained to a fixed character.

2. In a computer system, a method of identifying one or more defined variable name ranges to which a variable belongs, wherein each character position of the variable is associated with an attribute that defines a character type value for that character position, comprising generating a bit map for each defined range of variables, the bit map containing logical representations of the attributes associated with the character types each character position of a variable can acquire, generating a character map for each defined range of variables, the character map containing a fixed character for each character position that is constrained to that fixed character, and otherwise containing a representation of all attributes, creating a bit map for a variable, logically ANDing the range bit maps with the variable bit map and the character maps with the variable to determine a variable range that matches the variable.

3. In a computer system, a method of identifying one or more defined variable name ranges to which a variable belongs, wherein the variable has P character positions and each character position is associated with an attribute that defines a type of value for that character position, comprising creating a bit map to characterize the variable, wherein the bit map comprises a concatenation of Sub-bit maps, one Sub-bit map for each character position of the variable, and further wherein each Sub-bit map comprises a bit string that identifies a character group that represents the attribute of that character position, wherein each character group contains the smallest intersection of character attributes for that group, logically ANDing the variable bit map with a group bit map that characterizes the attributes of each character position of a valid variable range, Logically ANDing a character map with the variable, wherein the character Map is P positions long and each position contains a fixed character if the attribute of that position is constrained to that fixed character or otherwise is set equal to all attributes, Classifying the variable as matching the variable range if the result of the bit map ANDing operation is equal to the bit map of the variable, and the result of the character map ANDing operation is equal to the variable.

4. In a computer system, apparatus for identifying one or more defined variable name ranges to which a variable belongs, wherein each character position of the variable is associated with an attribute that defines a character type for that character position, comprising means for creating a bit map for the variable, means for comparing the variable bit map with range bit maps and means for comparing the variable with character maps to determine a variable range that matches the variable, wherein each range bit map contains logical representations of the attributes associated with the types of values each character position of a variable can acquire, and each character map describes whether each character position of a variable is constrained to a fixed character.

5. In a computer system, apparatus for identifying one or more defined variable name ranges to which a variable belongs, wherein each character position of the variable is associated with an attribute that defines a type of value for that character position, comprising means for generating a bit map for each defined range of variables, the bit map containing logical representations of the attributes associated with the types of values each character position of a variable can acquire, means for generating a character map for each defined range of variables, the character map containing a fixed character for each character position that is constrained to that fixed character, and otherwise containing a representation of all attributes, means for creating a bit map for a variable, means for logically ANDing the range bit maps with the variable bit map and the character maps with the variable to determine a variable range that matches the variable.

6. In a computer system, apparatus for identifying one or more defined variable name ranges to which a variable belongs, wherein the variable has P character positions and each character position is associated with an attribute that defines a character type for that character position, comprising means for creating a bit map to characterize the variable, wherein the bit map comprises a concatenation of Sub-bit maps, one Sub-bit map for each character position of the variable, and further wherein each Sub-bit map comprises a bit string that identifies a character group that represents the attribute of that character position, wherein each character group contains the smallest intersection of character attributes for that group, means for logically ANDing the variable bit map with a group bit map that characterizes the attributes of each character position of a valid variable range, means for logically ANDing a character map with the variable, wherein the character Map is P positions long and each position contains a fixed character if the attribute of that position is constrained to that fixed character or otherwise is set equal to all attributes, means for classifying the variable as matching the variable range if the result of the bit map ANDing operation is equal to the bit map of the variable, and the result of the character map ANDing operation is equal to the variable.

7. A computer program product, comprising a storage media containing computer program instructions for controlling a computer to perform the method of identifying one or more defined variable name ranges to which a variable belongs, wherein each character position of the variable is associated with an attribute that defines a character type for that character position, wherein the method comprises creating a bit map for the variable, comparing the variable bit map with range bit maps and comparing the variable with character maps to determine a variable range that matches the variable, wherein each range bit map contains logical representations of the attributes associated with the character types each character position of a variable can acquire, and each character map describes whether each character position of a variable is constrained to a fixed character.

8. A computer program product, comprising a storage media containing computer program instructions for controlling a computer to perform the method of identifying one or more defined variable name ranges to which a variable belongs, wherein each character position of the variable is associated with an attribute that defines a character type for that character position, comprising generating a bit map for each defined range of variables, the bit map containing logical representations of the attributes associated with the types of values each character position of a variable can acquire, generating a character map for each defined range of variables, the character map containing a fixed character for each character position that is constrained to that fixed character, and otherwise containing a representation of all attributes, creating a bit map for a variable, logically ANDing the range bit maps with the variable bit map and the character maps with the variable to determine a variable range that matches the variable.

9. A computer program product, comprising a storage media containing computer program instructions for controlling a computer to perform the method of identifying one or more defined variable name ranges to which a variable belongs, wherein the variable has P character positions and each character position is associated with an attribute that defines a character type for that character position, comprising creating a bit map to characterize the variable, wherein the bit map comprises a concatenation of Sub-bit maps, one Sub-bit map for each character position of the variable, and further wherein each Sub-bit map comprises a bit string that identifies a character group that represents the attribute of that character position, wherein each character group contains the smallest intersection of character attributes for that group, logically ANDing the variable bit map with a group bit map that characterizes the attributes of each character position of a valid variable range, Logically ANDing a character map with the variable, wherein the character Map is P positions long and each position contains a fixed character if the attribute of that position is constrained to that fixed character or otherwise is set equal to all attributes, Classifying the variable as matching the variable range if the result of the bit map ANDing operation is equal to the bit map of the variable, and the result of the character map ANDing operation is equal to the variable.

10. A carrier wave containing computer program instructions for controlling a computer to perform the method of identifying one or more defined variable name ranges to which a variable belongs, wherein each character position of the variable is associated with an attribute that defines a character type for that character position, wherein the method comprises creating a bit map for the variable, comparing the variable bit map with range bit maps and comparing the variable with character maps to determine a variable range that matches the variable, wherein each range bit map contains logical representations of the attributes associated with the types of values each character position of a variable can acquire, and each character map describes whether each character position of a variable is constrained to a fixed character.

11. A carrier wave containing computer program instructions for controlling a computer to perform the method of identifying one or more defined variable name ranges to which a variable belongs, wherein each character position of the variable is associated with an attribute that defines a character type for that character position, comprising generating a bit map for each defined range of variables, the bit map containing logical representations of the attributes associated with the types of values each character position of a variable can acquire, generating a character map for each defined range of variables, the character map containing a fixed character for each character position that is constrained to that fixed character, and otherwise containing a representation of all attributes, creating a bit map for a variable, logically ANDing the range bit maps with the variable bit map and the character maps with the variable to determine a variable range that matches the variable.

12. A carrier wave containing computer program instructions for controlling a computer to perform the method of identifying one or more defined variable name ranges to which a variable belongs, wherein the variable has P character positions and each character position is associated with an attribute that defines a character type for that character position, comprising creating a bit map to characterize the variable, wherein the bit map comprises a concatenation of Sub-bit maps, one Sub-bit map for each character position of the variable, and further wherein each Sub-bit map comprises a bit string that identifies a character group that represents the attribute of that character position, wherein each character group contains the smallest intersection of character attributes for that group, logically ANDing the variable bit map with a group bit map that characterizes the attributes of each character position of a valid variable range, Logically ANDing a character map with the variable, wherein the character Map is P positions long and each position contains a fixed character if the attribute of that position is constrained to that fixed character or otherwise is set equal to all attributes, Classifying the variable as matching the variable range if the result of the bit map ANDing operation is equal to the bit map of the variable, and the result of the character map ANDing operation is equal to the variable.

* * * * *